US012811286B2

(12) United States Patent
Reuser et al.

(10) Patent No.: US 12,811,286 B2
(45) Date of Patent: Nov. 24, 2026

(54) OUTDOOR LUMINAIRE FOR A STREETLIGHT

(71) Applicant: SIGNIFY HOLDING B.V., Eindhoven (NL)

(72) Inventors: René Cornelis Reuser, Velp (NL); Noud Johannes Fleuren, Baarlo (NL); Jonathan Hardy, Eastman (CA); Nicolaas Antonie Van Rijswijk, Oss (NL); Ronald Johannes Gelten, Geldriop (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 144 days.

(21) Appl. No.: 18/872,401

(22) PCT Filed: Jun. 8, 2023

(86) PCT No.: PCT/EP2023/065357

§ 371 (c)(1),
(2) Date: Dec. 6, 2024

(87) PCT Pub. No.: WO2023/242047

PCT Pub. Date: Dec. 21, 2023

(65) Prior Publication Data

US 2026/0254104 A1 Aug. 27, 2026

(30) Foreign Application Priority Data

Jun. 13, 2022 (EP) .................................... 22178653

(51) Int. Cl.
*H01Q 1/44* (2006.01)
*F21S 8/08* (2006.01)
*H05B 47/19* (2020.01)

(52) U.S. Cl.
CPC ................ *H01Q 1/44* (2013.01); *F21S 8/086* (2013.01); *H05B 47/19* (2020.01)

(58) Field of Classification Search
CPC ............ H01Q 1/44; F21S 8/086; H05B 47/19
See application file for complete search history.

(56) References Cited

U.S. PATENT DOCUMENTS

| | | | | |
|---|---|---|---|---|
| 10,935,198 | B2 * | 3/2021 | McDowell .............. | F21S 8/086 |
| 11,375,599 | B2 * | 6/2022 | Vendetti ................ | F21V 23/045 |
| 2020/0373682 | A1 | 11/2020 | Root et al. | |

(Continued)

FOREIGN PATENT DOCUMENTS

| | | |
|---|---|---|
| CN | 202266946 U | 6/2012 |
| CN | 204943247 U | 1/2016 |
| JP | 2017091958 A | 5/2017 |

*Primary Examiner* — Christopher E Dunay

(57) ABSTRACT

An outdoor luminaire for a streetlight includes an antenna system for transmitting and/or receiving wireless signals as well as a wireless communications module. The antenna system comprises at least one antenna housed within an antenna enclosure which allows the passage of the wireless signals. The outer housing comprises a recessed portion having a recess opening in the outer housing at the back of the recessed portion. The antenna enclosure sits within or behind the recess opening, such that the antenna enclosure is set back from the front opening all around the antenna enclosure.

15 Claims, 6 Drawing Sheets

(56) References Cited

U.S. PATENT DOCUMENTS

| | | | | |
|---|---|---|---|---|
| 2020/0374980 | A1 * | 11/2020 | Zimmerman, III ... | H04W 16/26 |
| 2023/0092803 | A1 * | 3/2023 | McDonald .............. | F21S 8/033<br>362/147 |
| 2023/0151944 | A1 * | 5/2023 | Castillo ................... | F21S 8/086<br>385/27 |
| 2025/0251120 | A1 * | 8/2025 | Fleuren ................... | F21S 8/088 |

* cited by examiner

OUTDOOR LUMINAIRE FOR A STREETLIGHT

CROSS-REFERENCE TO PRIOR APPLICATIONS

This application is the U.S. National Phase application under 35 U.S.C. § 371 of International Application No. PCT/EP2023/065357, filed on Jun. 8, 2023, which claims the benefit of European Patent Application No. 22178653.6, filed on Jun. 13, 2022. These applications are hereby incorporated by reference herein.

FIELD OF THE INVENTION

The present invention relates to the field of luminaires, and in particular to luminaires for a streetlight.

BACKGROUND OF THE INVENTION

Luminaires for streetlights are well known, and have been continuously developed for a number of decades. A recent trend is the use of light emitting diode systems as light sources in such streetlights. A cobra head design is common to ensure that light emitted by a streetlight is emitted downwards, i.e., towards the ground, thereby reducing light pollution.

It has been proposed to integrate an antenna system and wireless module with a luminaire for a streetlight, e.g., for the purposes of providing wireless connectivity to individuals in the vicinity of the streetlight and/or to form a connectivity grid.

There needs to be a clear path for the RF signals used by the antenna system, but the components of the luminaire (including the antennas) also need to have ingress protection. Mounting the antennas inside the main housing will reduce the signal strength, but mounting them externally will expose them to damage.

US 2020/373682 discloses an outdoor luminaire with a communications module piggy-backed on top of the main luminaire housing. Each antenna is housed in its own antenna containment structure such as a plastic housing which allows the RF signals to propagate. These antenna container structures may be partially internal and partially external to the housing of the communications module or they may be recessed to be flush with the housing of the communications module.

There remains a difficulty integrating antennas into the main luminaire housing.

SUMMARY OF THE INVENTION

The invention is defined by the claims.

According to examples in accordance with an aspect of the invention, there is provided an outdoor luminaire for a streetlight, comprising:

- an outer housing;
- a light source within the outer housing;
- an antenna system for transmitting and/or receiving wireless signals; and
- a wireless communications module within the outer housing communicatively coupled to the antenna system and configured to control the transmission of transmitted wireless signals by the antenna system and/or process receiving wireless signals received at the antenna system, wherein:

- the antenna system comprises at least one antenna housed within an antenna enclosure which allows the passage of the wireless signals;
- the outer housing comprises a recessed portion having a recess opening in the outer housing at the back of the recessed portion, and the front of the recessed portion comprises a front opening; and
- the antenna enclosure sits within or behind the recess opening, such that the antenna enclosure is set back from the front opening all around the antenna enclosure.

This luminaire design has one or more antennas recessed behind the general outer envelope of the outer housing. This protects them from damage by contact, or from hail, rain or other weather conditions like sunlight. The antenna enclosure protects the antenna so that it can be exposed to the ambient surroundings through the recess opening at the back of the recessed portion. The antenna enclosure or antenna enclosures are for example mounted to a chassis within the outer housing, and that chassis for example supports the wireless communications module and it may support a heatsink for the wireless communications module.

The front opening may be considered to correspond to a portion of the outer housing which would be present in the absence of the recessed portion.

The antenna enclosure is for example set back from the front opening by at least 1 cm along at least one edge of the antenna enclosure and/or the antenna enclosure is set back from the front opening by at the most 10 cm along any edge of the antenna enclosure.

Thus, at least part the antenna enclosure is recessed far back into the outer housing. The set-back distance described above may be at least 2 cm, more preferably at least 2.5 cm and most preferably at least 3 cm. The maximum distance described above is preferably 9 cm or more preferably 8 cm and most preferably 7 cm.

The recessed portion may comprise top and bottom recess walls and side recess walls, wherein the recess walls taper outwardly from the back of the recessed portion.

The taper allows the antenna to transmit and receive over its intended field of view. The taper is steep enough that the recess forms an indented area rather than a smooth continuation of the general curvature of the outer housing.

The angle of taper of the top and bottom recess walls is for example less than the angle of taper of the side recess walls. The antenna is for example intended to have a wider field of view in the horizontal plane than in the vertical plane.

The angle of taper of the top and bottom recess walls may be different and/or the recess length of the top and bottom recess walls may be different. Thus, the recess walls may be shaped to match a desired outer contour of the outer housing.

The angle of taper of the top and bottom recess walls, relative to a non-tapered direction, is for example in the range 10 to 25 degrees.

The angle of taper of the side recess walls, relative to a non-tapered direction, is for example in the range 25 to 60 degrees.

The antenna system may comprise an array of antennas, each housed within a respective antenna enclosure. This enables the range of directions for communication to be extended.

The array of antennas may comprise a set of four antennas each facing outwardly at 90 degree intervals in a plane which is intended to be horizontal in use of the luminaire.

This enables all around communication in a horizontal plane, for example between luminaires forming a grid of streetlights.

The light source is for example part of a light source module which is housed within a light source module ingress protection enclosure, the wireless communications module is housed within a communication module ingress protection enclosure, and each antenna enclosure provides ingress protection to its associated antenna.

The antennas, light source module and wireless communications module preferably each have their own ingress protection. Thus, they may be used in a modular manner, and the final outer housing does not need to have ingress protection. Instead, it may be designed to allow a flow of ambient air for cooling.

The light source module for example comprises the light source and a light source driver and/or controller circuit, and the wireless communication module is attached to a heatsink. The wireless communications module is associated with its own heatsink, which may be separate to a heatsink for the light source module.

There may be an air inlet gap between at least one outer edge of the antenna enclosure and the recess opening, such as between a top edge, side edge and/or bottom edge of the antenna enclosure and the recess opening. This air gap is around, or partially around the (or each) antenna module to provide a flow of cooling air into the space defined by the outer housing.

The antenna enclosure may instead close the recess opening, and the recessed portion comprises an air inlet opening in one or more of top, bottom, side and rear recess walls of the recessed portion. This alternative has the antenna module close the recess opening but a flow of cooling air is provided into the space defined by the outer housing though one or more openings in the walls that define the recessed portion.

The air inlet gap or air inlet opening for example leads to a heatsink for the light source. Thus, the air flow takes heat away from the light source.

The outer housing may further comprise air outlet openings. Thus, a flow of air into and out of the main housing is promoted. These air outlet openings are for example at the top of the outer housing so that heated air rises through the air outlet openings and a flow is generated.

The outer housing for example comprises a top canopy and a luminaire housing, the top canopy being arranged on top of the luminaire housing. The light source is then arranged within the luminaire housing whereas the wireless communications module is within the top canopy. The recessed portion of the outer housing is then also formed in the top canopy.

The luminaire housing may provide a self-contained luminaire function, and the top canopy provides the additional wireless connectivity capability.

The invention also provides a streetlight comprising:

a pole;

the luminaire defined above mechanically mounted to the pole.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
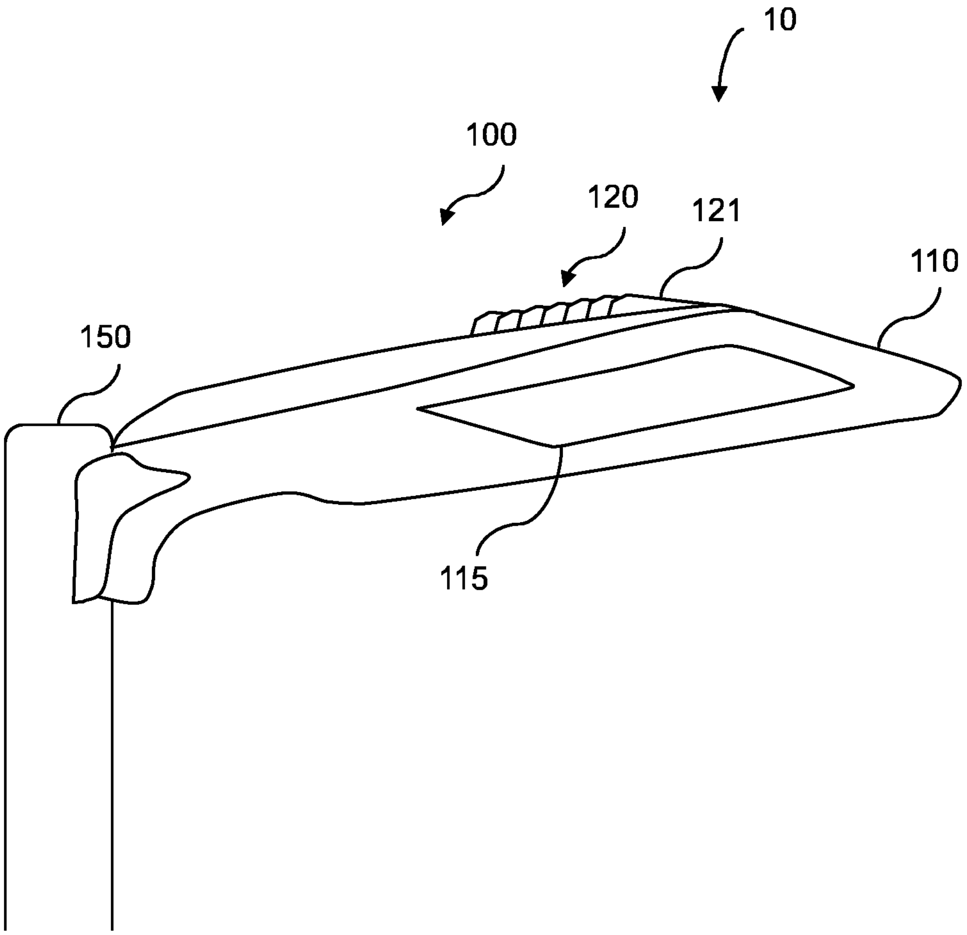
FIG. 1 illustrates a known general configuration of a streetlight.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an outdoor luminaire for a streetlight which includes an antenna system for transmitting and/or receiving wireless signals as well as a wireless communications module. The antenna system comprises at least one antenna housed within an antenna enclosure which allows the passage of the wireless signals. The outer housing comprises a recessed portion having a recess opening in the outer housing at the back of the recessed portion. The antenna enclosure sits within or behind the recess opening, such that the antenna enclosure is set back from the front opening all around the antenna enclosure.

The general form of one example of a streetlight design will first be described, to which the invention may be applied. The way the invention is applied to the design will then be described.

FIG. 1 illustrates a known general configuration of a streetlight 10, for the purposes of improved contextual understanding.

The streetlight comprises an outdoor luminaire 100 and a pole 150. The outdoor luminaire 100 is mechanically mounted upon the pole 150, e.g., by way of one or more fastening means.

The outdoor luminaire 100 comprises a luminaire housing 110. The luminaire housing 110 defines a light exit window 115, and a first heatsink 120 is formed on the luminaire housing 110. The luminaire housing defines an ingress protection enclosure.

The light exit window 115 is configured to allow the passage of light from inside the luminaire housing 110 out of the housing. Preferably, the light exit window 115 is formed of a transparent or translucent material (e.g., glass or plastic). However, in some examples, the light exit window may be formed from a gap or hole in the luminaire housing.

The first heatsink 120 is configured to conduct heat generated by elements contained by the luminaire housing, i.e., by the outdoor luminaire 100, away from the outdoor luminaire 100. The first heatsink comprises a first set of fins 121. Fins provide a reliable and well-established technique for conducting heat away from an object. The first heatsink is a light source heatsink and is the primary heatsink of the luminaire.

The outdoor luminaire further comprises a light source (not visible). The light source is positioned inside the luminaire housing, between the light exit window 115 and the first heatsink 120. Light emitted or generated by the light source is output through the light exit window. Heat generated by the light source (which typically forms about 20%-30% of the energy produced by the light source) is thermally conducted away from the outdoor luminaire 100 by the first heatsink 120.

The luminaire housing 110 thereby forms a light source housing, in that is houses the light source and is configured to dissipate heat generated by the light source.

Figure 2:
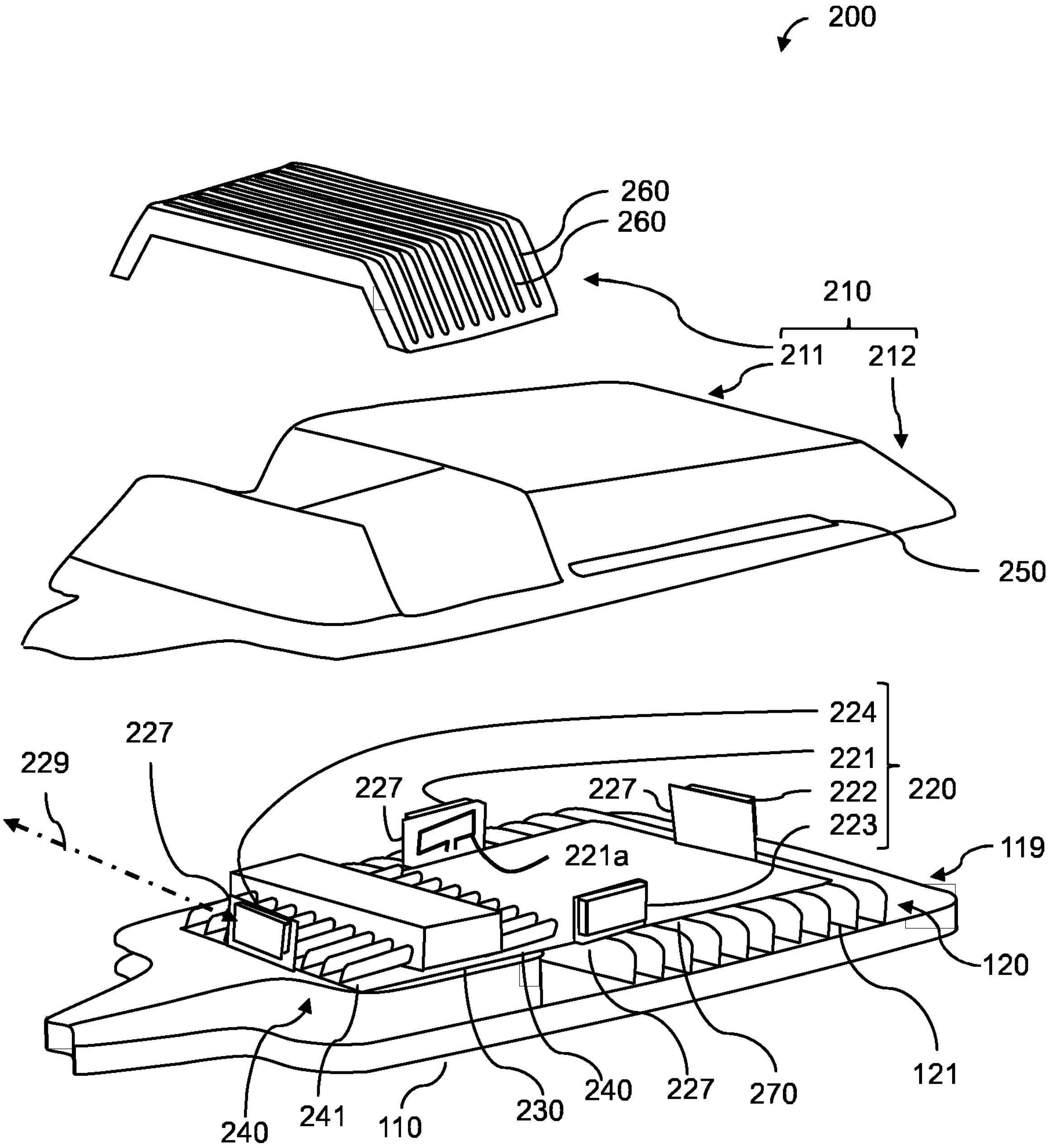
FIG. 2 shows a modified design which has been proposed, but not yet published, by the applicant.

FIG. 2 shows a modified design which has been proposed, but not yet published, by the applicant.

FIG. 2 shows a luminaire 200 which again comprises a luminaire housing 110, which may be formed in a similar/identical manner to the previously described luminaire housing. Thus, the housing defines a light exit window (not visible) and includes a first heatsink 120. The first heatsink is configured to conduct heat away from the luminaire housing.

The outdoor luminaire 200 also comprises a light source (not visible). The light source is positioned inside the luminaire housing, between the light exit window and the first heatsink 120. As previously mentioned, the luminaire housing 110 thereby forms a light source housing.

The outdoor luminaire 200 further comprises a top canopy 210. This top canopy may be considered to comprise a top part of an overall outer housing of the luminaire. The top canopy 210 comprises an upper portion 211 and a side portion 212. It is fitted over the luminaire housing 110 which may be considered to comprise a bottom part of the overall outer housing of the luminaire.

The upper portion 211 of the canopy 210 is configured to cover an uppermost surface 119 of the luminaire housing 110. In particular, the upper portion 211 is configured to cover at least a part of the first heatsink 120 defined by the luminaire housing 110.

The side portion 212 is configured to connect or couple the upper portion 211 to the luminaire housing. This can be performed using a clipping mechanism or other connection means.

The upper portion 211, the side portion 212 and the covered portion of the uppermost surface 119 of the luminaire housing 110 together form or define a canopy enclosure. The canopy enclosure is therefore a volume that is bound by the upper portion 211 and the side portion 212 of the canopy 210, as well as the covered portion of the uppermost surface 119 of the luminaire housing.

The canopy 210 thereby acts as a covering or additional covering to cover at least a portion of the uppermost surface of the luminaire housing. The canopy closure effectively forms a distinct covered volume (separate from the volume enclosed by the luminaire housing 110). Put another way, the canopy may form a second chamber that is separated from a first chamber (formed in the luminaire housing) by the uppermost surface of the luminaire housing.

The canopy enclosure (defined by the volume enclosed by the canopy 210 and the uppermost surface 119 of the luminaire housing 110) is configured to house a portion (e.g., part or all) of the first set of fins of the first heatsink 120. Thus, at least some of the heat produced or conducted from the luminaire housing 110 (e.g., originally generated by the light source within the housing 110) is introduced into the canopy enclosure.

The outdoor luminaire 200 further comprises an antenna system 220, which is housed or contained within the canopy enclosure. Thus, the antenna system 220 is formed within a volume bounded by the upper portion 210 of the canopy, the side portion 212 of the canopy and the uppermost surface 119 of the luminaire housing 110. The antenna system 220 is configured to transmit and/or receive wireless signals 229.

In the illustrated example, the antenna system 220 comprises a plurality of four antenna modules 211, 212, 213, 214. However, the antenna system 220 may comprise any number of antenna modules, e.g. a single antenna module, two antenna modules, three antenna modules or more than four antenna modules. Each antenna system includes an antenna and antenna circuitry. The antenna 211*a* of antenna module 211 is shown schematically in FIG. 2.

Each antenna module may be mounted on or supported by a respective antenna mount 227. Each antenna mount 227 may be configured to extend towards the upper portion 211 of the canopy 210.

The outdoor luminaire 200 further comprises a wireless communications module 230 i.e. a radio module. The wireless module is communicatively coupled to the antenna system 220. The wireless communications module 230 is configured to control the transmission of wireless signals 229, such as electromagnetic signals like radio signals, by the antenna system 220. The wireless communications module 230 is also configured to process received wireless signals obtained by the antenna system 220. The wireless communications defines an ingress protection enclosure.

The wireless communications module 230 may, for instance, comprise a modem, a processing unit and/or an input/output unit within an ingress protection enclosure. Suitable examples of wireless modules for handling and processing wireless signals are well established in the art, and have not been described in detail for the sake of clarity.

The wireless signals 229 controlled by the wireless module may operate according to any known wireless communication protocol. Suitable wireless communication protocols include an infrared link, ZigBee, Bluetooth, a wireless local area network protocol such as in accordance with the IEEE 802.11 standards, a 2G, 3G, 4G, 5G or 6G telecommunication protocol, and so on. Other formats will be readily apparent to the person skilled in the art.

In some examples, the wireless signals 229 transmitted and/or received by the wireless module 230 and antenna system 220 are unrelated to the operation of the light source (not shown). In particular examples, the antenna module 220 and the wireless communications module 230 may act as a node for a network of nodes for providing wireless coverage within an area covered by the network of nodes. Thus, the antenna module 220 and the wireless communications module 230 may be configured to act as a node as part of a wireless mesh network.

Of course, in other examples, the wireless signals 229 transmitted and/or received by the wireless communications module 230 and antenna system 220 may be related to the operation of the light source. Thus, the two modules/systems may act together to provide information to controlling one or more parameter or properties of the light source.

Each antenna module 221, 222, 223, 224 of the antenna system 220 may provide an antenna for the wireless module 230. The line of sign of the antenna module may define a range of directions from which wireless signals are received at and/or output by the antenna module.

To achieve improved range of sensitivity to wireless signals, the antenna system may be configured, e.g., through appropriate selection and placement of any antenna module(s) 221, 222, 223, 224, such that the combined line of sight for the antenna system 220 covers a 360° range in the horizontal plane.

By way of example, for an antenna system comprising four antenna modules, the antenna modules may be aligned in a cross-shaped arrangement. In such a cross-shaped arrangement the angle between the line of sight of antenna modules may be 90° (i.e. ß=90°). In this way, the radiation patterns of the four antenna modules is effectively able to cover a 360° range in the horizontal plane for improved sensitivity.

The outdoor luminaire 200 further comprises a second heatsink 240, a portion of which is housed by the canopy enclosure, in thermal contact with the wireless communications module 230. Thus, the second heatsink is configured to conduct and release heat generated by the wireless module. At least some of the heat output by the second heatsink is passed into the canopy enclosure. The second heatsink is a wireless communications module heatsink and is a secondary heatsink of the luminaire.

As previously mentioned, at least some of the heat produced by the first heatsink and second heatsink is introduced or emitted into the canopy enclosure.

To provide improved thermal management of the heat produced by the outdoor luminaire 200, the upper portion and/or side portion of the canopy comprise(s) one or more air inlets 250 for allowing the passage of external air into the canopy.

The upper portion 211 and/or side portion 212 also comprise(s) one or more air outlets 260 for allowing the passage of internal air, being external air drawn through the air inlets and heated by the first and/or second heatsinks, out of the canopy.

An air inlet or an air outlet can be embodied as a hole, gap or slit within the canopy. Preferably, each air inlet or outlet is formed from an elongate hole or gap. Each air inlet or outlet is preferably a hole completely surrounded or bounded by material of the canopy, to provide improved structural integrity of the canopy.

In this way, the outdoor luminaire provides a mechanism for evacuating or dispersing heat introduced into the canopy enclosure by the first/second heatsinks. The air inlet(s) and the air outlet(s) thereby provide a path for fresh or cooler air to flow through the canopy enclosure to push air heated by the heatsinks out of the canopy enclosure.

To improve the effect of heat dissipation from the canopy enclosure, one or more air inlets may be positioned on the side portion 212 of the canopy enclosure 210 and one or more air outlets may be positioned on the upper portion 211 of the canopy enclosure 210. This achieves a chimney effect, in which cool air is drawn in from a lower position or location, and warmed or heated air is emitted from a higher position or location.

Thus, when the luminaire is installed, the air inlet(s) may be located below the air outlet(s). As warm air rises above cool air, this makes use of a chimney or stack effect to encourage the movement of air through the air inlet(s) and to the air outlet(s). As the heatsinks are positioned between the air inlet(s) and the air outlet(s), air drawn in by the canopy enclosure is heated and expelled out of the air outlets.

The proposed canopy enclosure thereby provides a means for good or improved thermal management of an outdoor luminaire.

To improve the heat dissipation by the second heatsink, the second heatsink 240 may comprise a second set of fins 241 that are configured to extend toward the upper portion 211 of the canopy 210. This can improve or encourage heat dissipation towards the upper portion of the canopy, and therefore towards any air outlets 260 positioned in the upper portion.

In the example shown, a planar element 270 is mechanically connected to the first heatsink 120. In particular, a planar element 270 is mounted on top of the first heatsink, i.e., to cover at least a portion of the first set of fins 121. The planar element 270 is housed by/in the canopy enclosure. The planar element is thermally conductive, e.g., is made from a thermally conductive material such as a metal and it is thermally connected to the first heatsink. In this way, the planar element can act as an extra heatsink or heat distribution element for distributing heat (from the first heatsink) about the canopy enclosure. This can improve the thermal management of the outdoor luminaire. The planar element functions as a chassis.

The thermally conductive planar element 270 is further thermally coupled to the second heatsink 240. Thus, the planar element may provide a thermal path (a path that is thermally conductive) between the first heatsink 120 and the second heatsink 240. This further improves distribution of heat about the canopy enclosure.

The light source is likely to produce a greater amount of (waste) heat, compared to the wireless communications module 230. This is due to the reduced efficiency of the light source compared to the wireless module. It would therefore be advantageous to improve the dissipation of heat from the first heatsink by thermally coupling the first heatsink to the second heatsink via the planar element. This improves the thermal management of the outdoor luminaire.

This invention relates in particular to the design of the canopy 210 and in particular to improve the transmission and reception of wireless communications signals as well as protecting the antennas.

Figure 3:
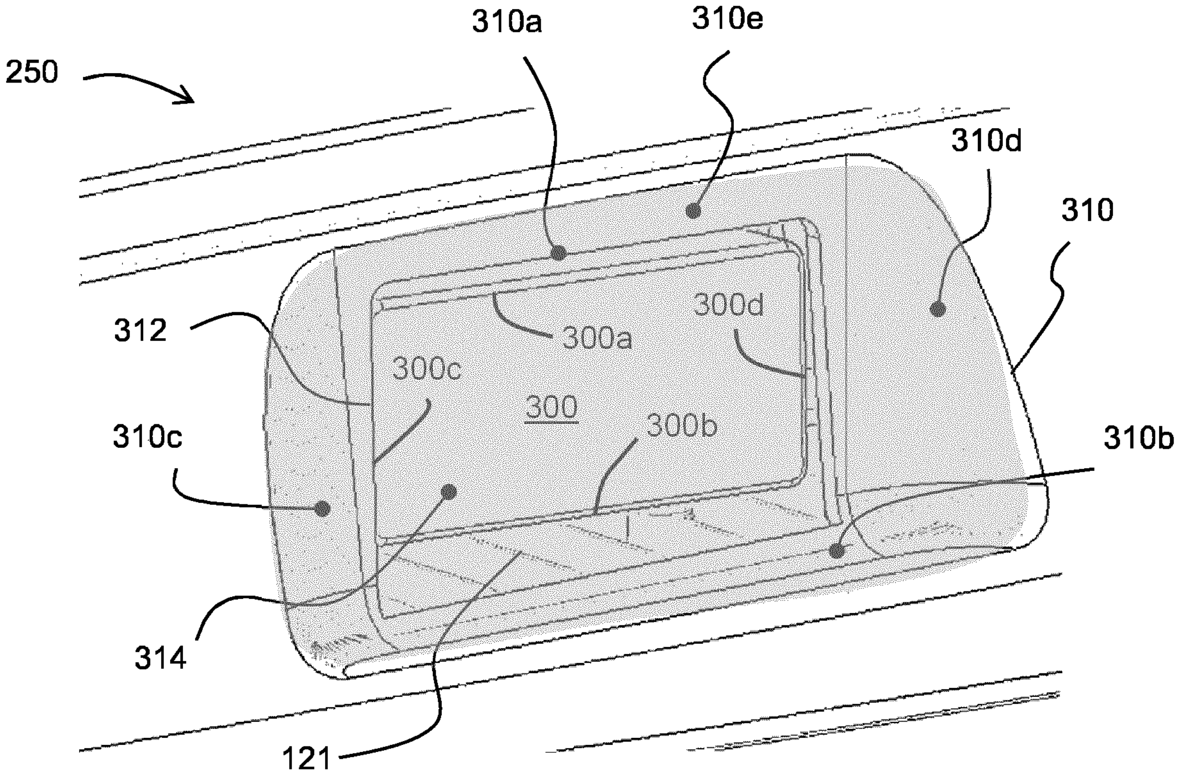
FIGS. 3 and 4 show the outer housing design for an outdoor luminaire in accordance with an example of the invention, in the vicinity of one of the antennas.
Figure 4:
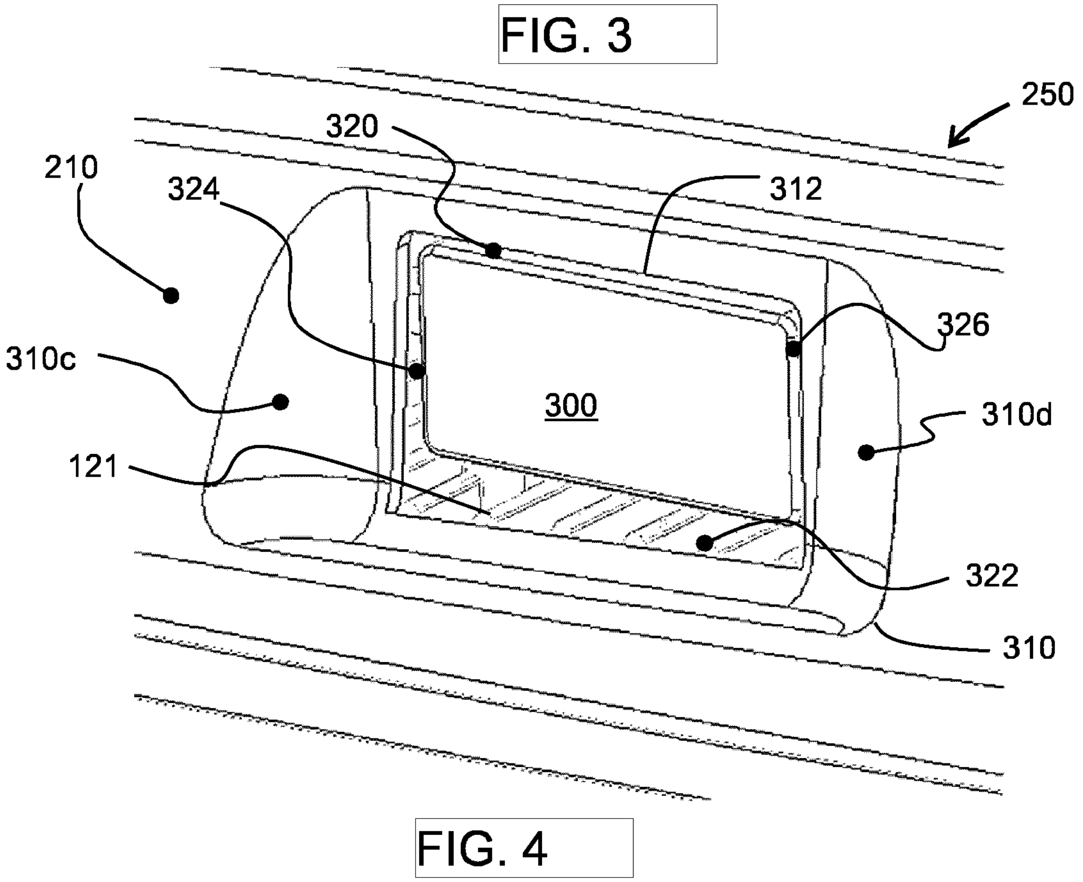

FIGS. 3 and 4 show the outer housing design for an outdoor luminaire 250 in accordance with an example of the invention, in the vicinity of one of the antennas.

The antennas of the antenna system are each housed within an antenna enclosure 300, one of which is shown in FIG. 3. The antenna enclosure 300 has a top edge 300*a*, a bottom edge 300*b*, and side edges 300*c*, 300*d*.

Each antenna enclosure 300 allows the passage of the wireless signals 229. For example, the antenna enclosures are plastic. They provide ingress protection to protect the antenna within. The wireless communications module 230 is also formed within an ingress protected enclosure, and the light source also has its own ingress protected enclosure. The enclosure of the light source for example houses a light source module which comprises the light source and a light source driver and/or controller circuit.

As a result, it is acceptable to have openings to the canopy 210 because the parts that need ingress protection are individually protected in a modular manner.

The outer housing, in particular the canopy 210 which forms a top part of the outer housing, comprises a recessed portion 310 having a recess opening 312 in the outer housing at the back of the recessed portion. FIGS. 3 and 4 show two views of one recessed portion 310 for one of the antenna enclosures 300. The front of the recessed portion 310 comprises a front opening 314, shown shaded in FIG. 3. It has the shape of a cut out of the general outer envelope shape in which the recessed portion may be considered to be located.

The antenna enclosure 300 sits within or behind the recess opening 312, such that the antenna enclosure is set back from the front opening 314 all around the antenna enclosure. The sending/receiving surface of the antenna module within the antenna enclosure 300 is not covered by the outer housing and the that the antenna enclosure is set further back than flush with the front opening 314, all around the antenna enclosure.

The luminaire design thus has one or more antennas in enclosures recessed behind the general outer envelope of the outer housing 110, 210. This protects them from damage by contact, or from hail, rain or other weather conditions like sunlight. The antenna enclosure 300 protects the antenna so that it can be exposed to the ambient surroundings through the recess opening at the back of the recessed portion. The front opening 314 may be considered to correspond to a portion of the outer housing which would be present in the absence of the recessed portion.

The canopy 210 for example has a curved envelope profile, whereas the antenna enclosures are for example planar and mounted vertically. As a result, the depth of the recess (to reach the front 314 of the recess opening 312) is not the same all around the antenna enclosure 300. For a domed canopy as shown, the depth of the recess at the top edge is less than the depth of the recess at the bottom edge.

The antenna enclosure is set back all around its periphery (i.e. by at least a non-zero distance from the front opening 314). The antenna enclosure is for example set back from the front opening by at least 1 cm (e.g. at least 2 cm, or 2.5 cm or 3 cm) along at least one edge of the antenna enclosure. The obtained effect is improved protection of the antenna. The antenna enclosure is for example set back from the front opening by at most 10 cm (e.g. at most 9 cm, or 8 cm or 7 cm) along any edge of the antenna enclosure. The obtained effect is sufficient transmission and reception performance of the wireless signals.

The recessed portion 310 comprises top and bottom recess walls 310*a*, 310*b* and side recess walls 310*c*, 310*d*. The recessed portion has a back recess wall 310*e*. The recess walls 310*a*-310*d* taper outwardly from the back wall 310*e* of the recessed portion.

The taper allows the antenna to transmit and receive over its intended field of view. The taper is steep enough that the recess forms an indented area rather than a smooth continuation of the general curvature of the outer housing. Thus, there is an abrupt angular transition from a smooth general outer contour of the canopy 210 to the top, bottom and/or side recess walls of the recessed portion 310.

The angle of taper of the top and bottom recess walls is for example less than the angle of taper of the side recess walls. The antenna is for example intended to have a wider field of view in the horizontal plane than in the vertical plane.

The recess side walls 310*c*, 310*d* typically have the same angle of taper, so that the recess is laterally symmetrical (although the angle of taper may not be uniform along the height of the side walls, since the outer envelope will have a curved shape). However, the angle of taper of the top and bottom recess walls may be different and hence non-symmetrical in the vertical direction.

The angle of taper of the top and bottom recess walls, relative to a non-tapered direction, is for example in the range 10 to 25 degrees. The angle of taper of the side recess walls, relative to a non-tapered direction, is for example in the range 25 to 60 degrees. This is for example to match the anisotropic line of sight of each antenna module, such as 2×12 degrees (vertical) and 2×45 degrees (horizontal).

As can be seen in FIGS. 3 and 4, the recess opening 312 in this example is larger than the antenna enclosure 300, so that there is a gap between an outer edge of the antenna closure and the recess opening 312. In FIGS. 3 and 4, there is a gap adjacent each edge (FIG. 4 shows a top gap 320, bottom gap 322 and side gaps 324, 326). However, there may be fewer gaps or only one gap such as beneath the antenna enclosure 300.

The gap or gaps function as air inlet gaps between an outer edge of the antenna enclosure 300 and the recess opening 312. The air gaps provide a flow of cooling air into the space defined by the canopy 210 of the outer housing, to provide cooling as explained above. In particular, the air provided into the air inlets defined by these gaps preferably flows over the fins 121 of the heatsink of the light engine. It may cool the antenna module as well. Fins of the heatsink of the light engine are for example aligned in a direction perpendicular to the one or more air inlet openings. Air outlets 260 are for example provided at the top of the canopy as shown in FIG. 2. There may be a plurality M of air outlets, where M is larger than the number N of air inlets. In FIGS. 3 and 4, the bottom gap 322 allows the fins 121 to be seen.

Figure 5:
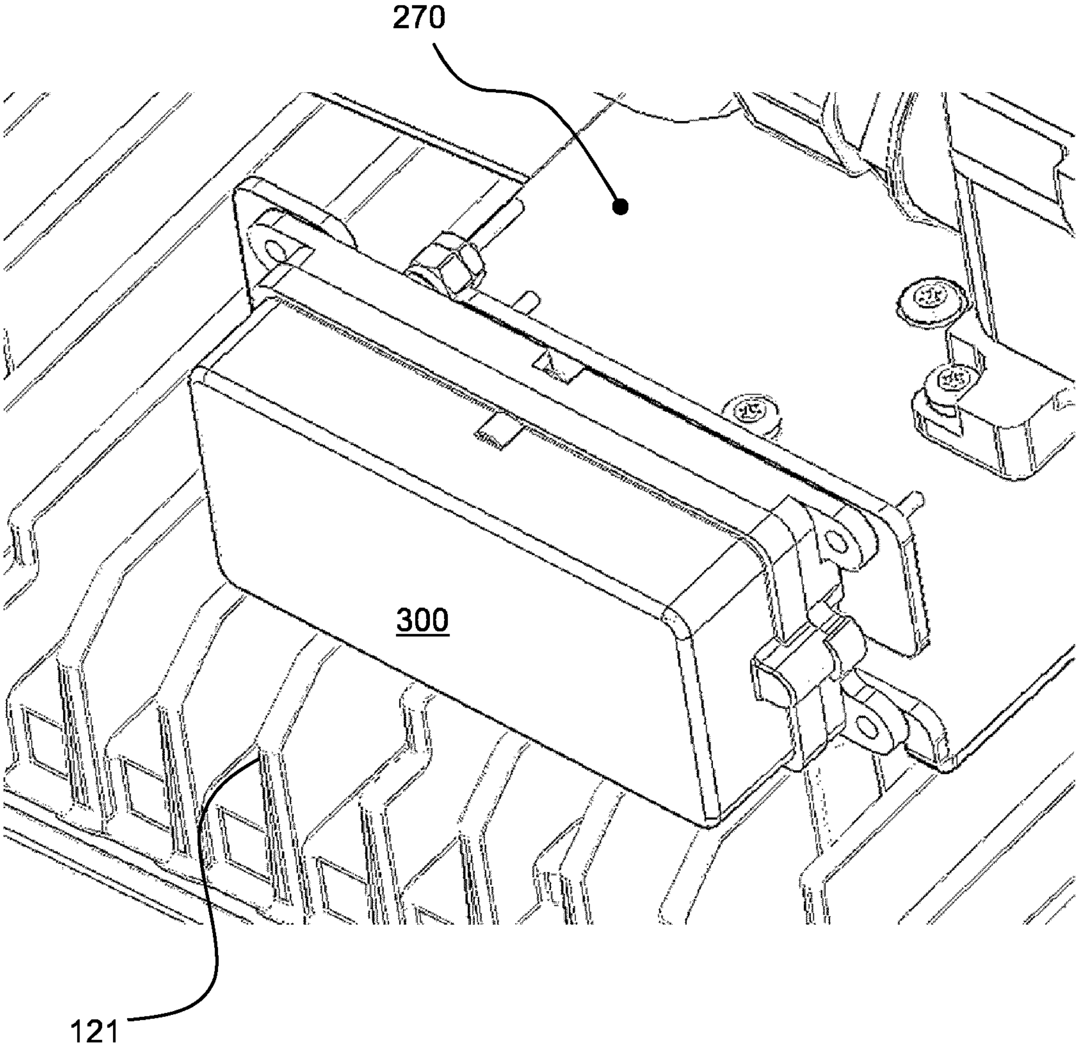
FIG. 5 shows a view of the antenna module with the canopy removed.

FIG. 5 shows a view of the antenna module with the canopy 210 removed.

Figure 6:
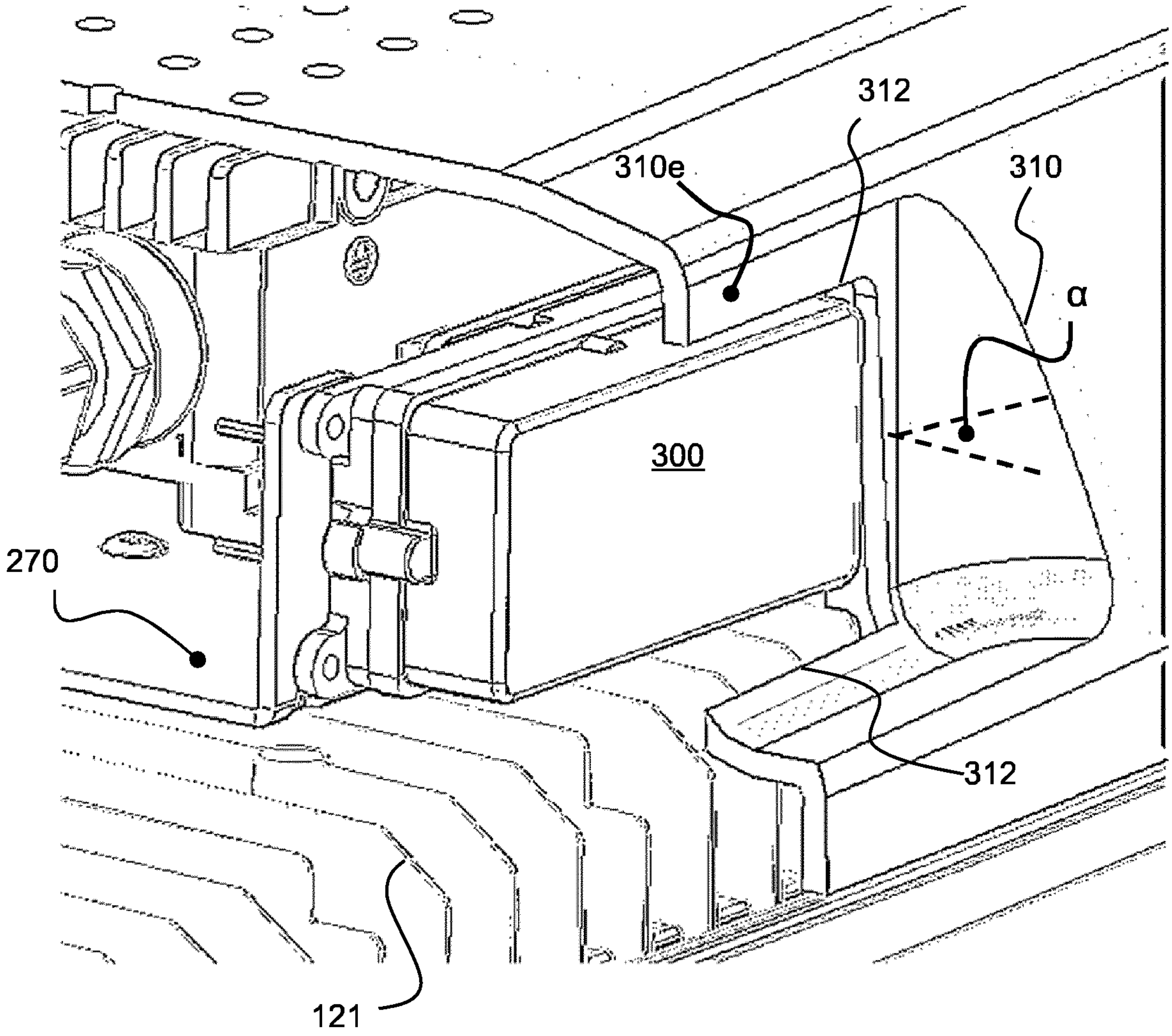
FIG. 6 shows a cut away view of the canopy over the antenna envelope.

FIG. 6 shows a cut away view of the canopy 210 over the antenna envelope 300.

As shown in FIG. 6, the back wall 310*e* of the recessed portion is recessed further back at the bottom that the top. Indeed the top part of the back wall 310*e* is vertical and there is no forward projecting top recess wall. However, the top of the back wall 310*e* is nevertheless recessed compared to the original outer envelope shape (314 in FIG. 3) of the canopy 210, such as is present at each side of recessed portion 310.

FIG. 6 also represents one angle of taper a of the side wall, from the lateral edge of the front opening 314 to the back of the recess.

Figure 7:
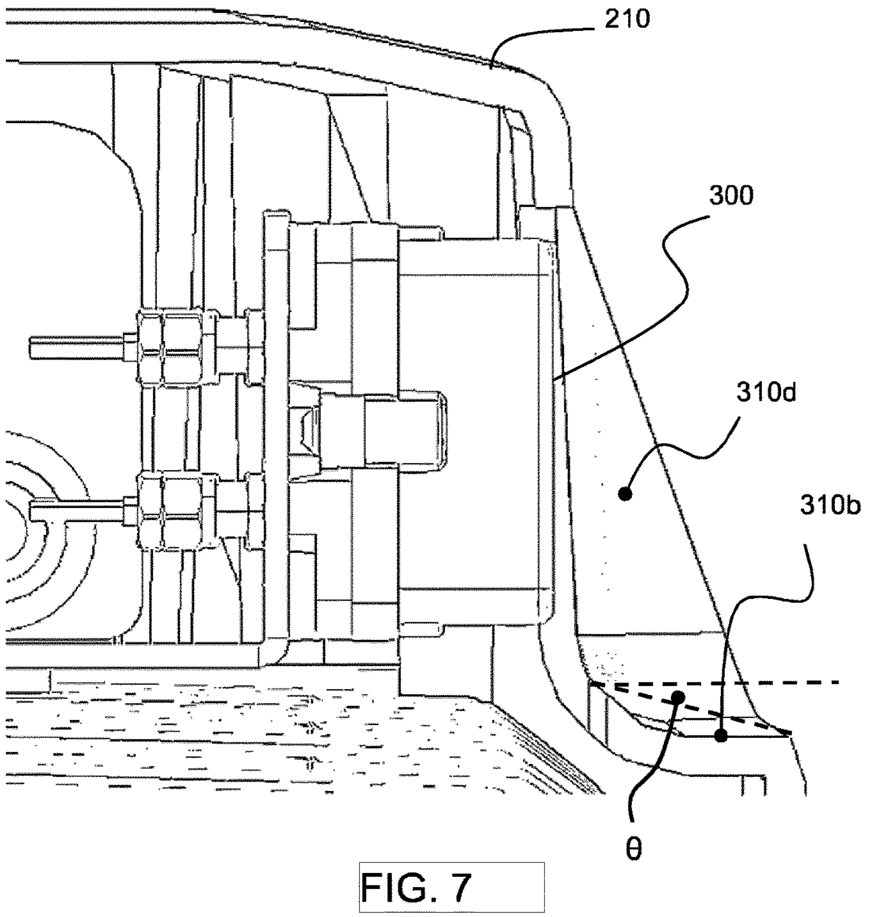
FIG. 7 shows a cross sectional side view.

FIG. 7 shows a cross sectional side view. It shows that the antenna enclosure sits behind the outer surface of the rear wall 310*e* of the recessed portion 310.

FIG. 7 also represents one angle of taper θ of the bottom wall, from the lower edge of the front opening 314 to the back of the recess.

The example above has air gaps around the antenna enclosure.

Figure 8:
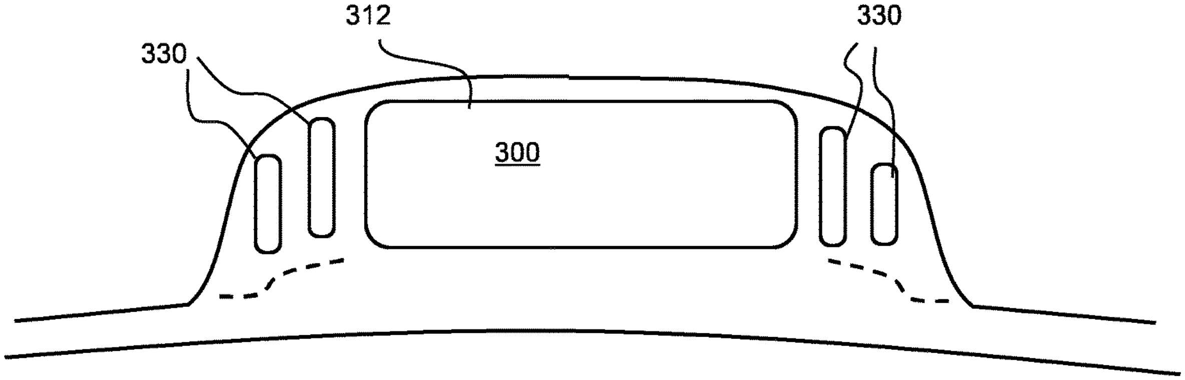
FIG. 8 shows an example of an antenna enclosure which closes the recess opening.

As shown in FIG. 8, the antenna enclosure may instead close the recess opening, and the recessed portion comprises an air inlet opening 330 in one or more of top, bottom, side and rear recess walls of the recessed portion. This alternative has the antenna module close the recess opening but a flow of cooling air is provided into the space defined by the outer housing though one or more openings in the walls that define the recessed portion.

Embodiments of the invention may also provide an outdoor lighting system comprising a plurality of streetlights which each include a luminaire as described above. The plurality of streetlights may be in mutual line of sight and/or communication. The wireless modules of each of the plurality of streetlights may be in wireless communication with one another, to effectively form a network of wireless modules. This can be used to provide wireless connectivity to mobile devices in the vicinity of the network of wireless modules.

The plurality of streetlights may number at least ten, thousand, or ten thousand or even over hundred thousand for very extensive communication networks covering a whole city, country and/or continent.

Using the above-described outdoor luminaire in the fixtures of the outdoor lighting system, it is possible to create a mesh network using the wireless modules of such luminaires. The mesh network can, for instance, be used to provide wireless connectivity to mobile devices in the vicinity of the network of wireless modules according to known principles.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. An outdoor luminaire for a streetlight, comprising:

an outer housing;

a light source arranged within the outer housing;

an antenna system for transmitting and/or receiving wireless signals; and a wireless communications module within the outer housing communicatively coupled to the antenna system and configured to control the transmission of transmitted wireless signals by the antenna system and/or process receiving wireless signals received at the antenna system, wherein:

the antenna system comprises at least one antenna housed within an antenna enclosure which allows the passage of the wireless signals;

the outer housing comprises a recessed portion having a recess opening in the outer housing at the back of the recessed portion, and the front of the recessed portion comprises a front opening; and the antenna enclosure sits within or behind the recess opening, such that the antenna enclosure is set back from the front opening all around the antenna enclosure.

2. The luminaire of claim 1, wherein:

the antenna enclosure is set back from the front opening by at least 1 cm along at least one edge of the antenna enclosure; and/or the antenna enclosure is set back from the front opening by at the most 10 cm along any edge of the antenna enclosure.

3. The luminaire of claim 1, wherein the recessed portion comprises top and bottom recess walls and side recess walls, wherein the (i) top and bottom and/or (ii) side recess walls taper outwardly from the back of the recessed portion.

4. The luminaire of claim 3, wherein the angle of taper of the top and bottom recess walls is less than the angle of taper of the side recess walls.

5. The luminaire of claim 4, wherein the angle of taper of the top and bottom recess walls are different and/or the recess length of the top and bottom walls are different.

6. The luminaire of claim 4, wherein:

the angle of taper of the top and bottom recess walls, relative to a non-tapered direction, is in the range 10 to 25 degrees; and/or the angle of taper of the side recess walls, relative to a non-tapered direction, is in the range 25 to 60 degrees.

7. The luminaire of claim 1, wherein the antenna system comprises an array of antennas, each housed within a respective antenna enclosure, for example a set of four antennas each facing outwardly at 90 degree intervals in a plane which is intended to be horizontal in use of the luminaire.

8. The luminaire of claim 1, wherein the light source is part of a light source module which is housed within the luminaire housing, wherein the luminaire housing defines an ingress protection enclosure, the wireless communications module defines an ingress protection enclosure, and each antenna enclosure provides ingress protection to its associated antenna.

9. The luminaire of claim 8, wherein the light source module comprises the light source and a light source driver and/or controller circuit, and the wireless communication module is attached to a wireless communication module heatsink.

10. The luminaire of claim 1, wherein there is an air inlet gap between at least one outer edge of the antenna enclosure and the recess opening, such as between a top edge, side edge and/or bottom edge of the antenna enclosure and the recess opening.

11. The luminaire of claim 1, wherein the antenna enclosure closes the recess opening, and the recessed portion comprises an air inlet opening in one or more of top, bottom, side and rear recess walls of the recessed portion.

12. The luminaire of claim 10, wherein the air inlet gap or air inlet opening leads to a light source heatsink for the light source.

13. The luminaire of claim 10, wherein the outer housing further comprises air outlet openings, such as air outlet openings in an upper portion of the outer housing.

14. The luminaire of claim 1, wherein:

the outer housing comprising a top canopy and a luminaire housing, the top canopy being arranged on top of the luminaire housing;

the light source is arranged within the luminaire housing;

the wireless communications module is arranged within the top canopy; and the recessed portion of the outer housing is formed in the top canopy.

15. A streetlight comprising:

a pole;

the luminaire of claim 1 mechanically mounted to the pole.

* * * * *